United States Patent [19]
Keville et al.

[11] Patent Number: 5,500,109
[45] Date of Patent: Mar. 19, 1996

[54] METHOD FOR PREPARING CATALYSTS COMPRISING ZEOLITES EXTRUDED WITH AN ALUMINA BINDER

[75] Inventors: Kathleen M. Keville, Beaumont, Tex.; Hye K. C. Timken, Woodbury, N.J.; Robert A. Ware, Wyndmoor, Pa.

[73] Assignee: Mobil Oil Corp., Fairfax, Va.

[21] Appl. No.: 324,305

[22] Filed: Oct. 17, 1994

Related U.S. Application Data

[62] Division of Ser. No. 70,822, Jun. 3, 1993, Pat. No. 5,378,671.

[51] Int. Cl.$^6$ .......................... C10G 47/16; C10G 47/18; C10G 47/20
[52] U.S. Cl. .............................. 208/111; 208/108; 208/109
[58] Field of Search ............................... 208/108, 109, 208/111; 502/85

[56] References Cited

U.S. PATENT DOCUMENTS

| | | | |
|---|---|---|---|
| 3,591,488 | 7/1971 | Eberly et al. | 208/111 |
| 3,706,694 | 12/1972 | Young | 208/111 |
| 3,761,396 | 9/1973 | Pickert | 208/111 |
| 4,423,266 | 12/1983 | Young | 585/481 |
| 4,563,435 | 1/1986 | Chu et al. | 502/85 |
| 4,582,815 | 4/1986 | Bowes | 502/64 |
| 4,683,214 | 7/1987 | Angevine et al. | 502/66 |
| 5,143,876 | 9/1992 | Chang et al. | 502/64 |

FOREIGN PATENT DOCUMENTS

| | | |
|---|---|---|
| 0251564 | 1/1988 | European Pat. Off. . |
| 1108113 | 4/1989 | Japan . |

*Primary Examiner*—E. Rollins Cross
*Assistant Examiner*—Walter D. Griffin
*Attorney, Agent, or Firm*—Alexander J. McKillop; Dennis P. Santini; Edward F. Kenehan, Jr.

[57] ABSTRACT

There is provided a method for preparing an alumina bound, zeolite catalyst, wherein a zeolite of low silanol content is used as the source of zeolite used to prepare the catalyst. A particular zeolite used in this catalyst is zeolite Y. This catalyst may be combined with at least one hydrogenation component and used to hydrocrack hydrocarbons, such as gas oils. In particular, an NiW/USY/alumina catalyst may be used in a hydrocracking reaction to produce distillate boiling range hydrocarbons from higher boiling hydrocarbons.

21 Claims, No Drawings

METHOD FOR PREPARING CATALYSTS COMPRISING ZEOLITES EXTRUDED WITH AN ALUMINA BINDER

CROSS-REFERENCE TO RELATED APPLICATION

This application is a division of U.S. Application Ser. No. 08/070,822, filed Jun. 3, 1993, now U.S. Pat. No. 5,378,671 the entire disclosure of which is expressly incorporated herein by reference.

BACKGROUND

There is provided a method for preparing an alumina bound, zeolite catalyst, wherein a zeolite of low silanol content is used as the source of zeolite used to prepare the catalyst. This catalyst may be combined with at least one hydrogenation component and used to hydrocrack hydrocarbons, such as gas oils.

Hydrocracking is a versatile petroleum refining process which enjoys widespread use in the refining industry. Hydrocracking has the ability to process a wide range of difficult feedstocks into a variety of desirable products. Feedstocks which may be treated by this process include heavy naphthas, kerosenes, refractory catalytically cracked cycle stocks and high boiling virgin and coker gas oils. At high severities, hydrocracking can convert these materials to gasoline and lower boiling paraffins; lesser severities permit the higher boiling feedstocks to be converted into lighter distillates such as diesel fuels and aviation kerosenes.

Hydrocracking is conventionally carried out at moderate temperatures of 350° C. to 450° C. (650° F. to 850° F.), because the thermodynamics of the hydrocracking process become unfavorable at higher temperatures. In addition, high hydrogen pressures, usually at least 5600 kPa (800 psig) are required to prevent catalyst aging and so to maintain sufficient activity to enable the process to be operated with a fixed bed of catalyst for periods of one to two years without the need for regeneration.

The catalysts used for hydrocracking usually comprise a transition metal such as nickel, cobalt, tungsten or molybdenum on an acidic support such as alumina or silica-alumina although noble metals such as platinum may also be used. Combinations of metals such as nickel with tungsten have been found to be extremely effective with a wide variety of feedstocks as has the presulfiding technique which is now widely employed.

Hydrocracking processes using the hydrogen form of zeolite Y as the acidic component are described, for example, in U.S. Pat. Nos. 3,269,934 and 3,524,809, and in "Preparation of Catalysts III", ed. by G. Poncelet, P. Grange, and P. A. Jacobs, Elsevier Science Publishers, 587 (1983).

SUMMARY

There is provided a method for preparing an alumina bound zeolite catalyst, said method comprising the steps of:
 (a) determining the silanol content of a zeolite;
 (b) mulling together alumina, said zeolite of step (a), and water under conditions sufficient to form an extrudable mass comprising an intimate mixture of alumina and said zeolite;
 (c) extruding the extrudable mass of step (b) under conditions sufficient to form a green strength extrudate; and
 (d) calcining the green strength extrudate of step (c) under conditions sufficient to increase the crush strength of the extrudate,
wherein said zeolite, which is introduced into mulling step (b), has a silanol content of less than 10%, expressed in terms of silicons containing silanols vs. total silicons.

There is also provided a method for preparing an alumina bound zeolite Y catalyst, said method comprising the steps of:
 (a) mulling together alumina, zeolite Y and water under conditions sufficient to form an extrudable mass comprising an intimate mixture of alumina and zeolite Y;
 (b) extruding the extrudable mass of step (a) under conditions sufficient to form a green strength extrudate; and
 (c) calcining the green strength extrudate of step (b) under conditions sufficient to increase the crush strength of the extrudate,
wherein said zeolite Y, which is introduced into mulling step (a), has a silanol content of less than 10%, expressed in terms of silicons containing silanols vs. total silicons.

There are also provided catalysts prepared by the above methods.

There is further provided a process for hydrocracking a hydrocarbon feedstock, said process comprising contacting said feedstock and hydrogen with a hydrocracking catalyst under sufficient hydrocracking conditions, said hydrocracking catalyst comprising a hydrogenation component and an extrudate prepared according to one of the above-mentioned methods.

EMBODIMENTS

Improved catalysts comprised of siliceous zeolites in an alumina binder are disclosed. The catalysts are prepared in such a manner than enables low acidity, high $SiO_2/Al_2O_3$ ratio zeolites to be stabilized toward increases in acid activity that arise from aluminum incorporation into the framework during the alumina binding procedure. The catalysts may be prepared from zeolites subjected to a thermal and/or hydrothermal treatment to reduce crystal defect sites, such as silanol groups, prior to contact with the alumina binder.

High silica/alumina ratio zeolites have been shown to be the preferred catalysts for many hydrocarbon upgrading processes under development for petroleum refining and petrochemical applications. These processes include hydrocracking (MPHC) for maximum distillate production. It has been found that high silica zeolites typically exhibit an increase in acid activity when bound in alumina. Alternate binding technology, such as silica binding as disclosed in U.S. Pat. No. 4,582,815, could be used to avoid activation of the zeolite by the binder. Activation of the zeolite by the alumina binder has been attributed to alumina incorporation into the zeolite framework which decreases the silica/alumina ratio and increases the zeolite acidity, as disclosed by C. D. Chang, S. D. Hellring, J. N. Miale, K. D. Schmitt, P. W. Brigandi, and E. L. Wu in *J. Chem. Soc.*, Faraday Trans., I, 81, 2215 (1985).

In many cases this activation has a detrimental impact on catalyst performance. For example, the performance of VGO hydrocracking catalysts comprised of large-pore zeolites disclosed in U.S. Pat. No. 4,820,402 demonstrates a unique relationship between selectivity to high value middle distillate products and increasing zeolite silica/alumina ratio. Furthermore, the occurrence of alumina binder activation in zeolites and the extent to which it occurs have been difficult to predict.

Binding the zeolites with silica is currently one of the preferred methods of eliminating this binder activation. In some applications, however, silica binding may not be applicable such as with bi-functional hydrocracking catalysts where a metal component must be dispersed on the binder. It would be desirable, therefore, to develop a procedure for preparing stable, low acidity zeolites in alumina binder.

This present invention relates to the preparation of high silica zeolite catalysts with improved resistance to alumina binder activation. The procedure may involve a zeolite treatment, such as mild steaming, to effect a reduction in structural defect sites within the zeolite, such as zeolite silanol groups, prior to contact with the alumina binder.

Previous investigators have identified defect sites, such as silanols, in high silica zeolites, such as ZSM-5, using FT-IR and $^{29}$Si MAS NMR as described by R. M. Dessau, K. D. Schmitt, G. T. Kerr, G. L. Woolery, and L. B. Alemany in *J. Catal.*, 104, 484 (1987). Hydrothermal treatment reduces the silanol content in ZSM-5 and this has been interpreted to occur through a silanol annealing mechanism. However, the relationship between zeolite silanol content and binder activation, and the necessity to control zeolite silanol content prior to contact with the alumina binder has heretofore not been recognized. The present invention describes an improved procedure for manufacture of low acidity, high silica zeolite catalysts in aluminum binder which may utilize a zeolite treatment prior to contact with alumina binder. The treatment provides benefits in terms of improved resistance of the zeolite to alumina binder activation.

The present method first involves combining alumina, zeolite and water in a mulling procedure. The amount of alumina should be an amount which is sufficient to provide a sufficient amount of crush strength to the ultimately produced extrudate. For example, the amount of alumina may be 20–80 wt. % on a 100% solids basis. The amount of zeolite should be an amount which is sufficient to provide a sufficient amount of catalytic activity to the ultimately produced catalyst. For example, the amount of zeolite may be 20–80 wt. % on a 100% solids basis. A sufficient amount of water should be added to provide a sufficient amount of extrudability to the solids in the mixture. For example, the amount of water may be 40–50 wt. % of the solids. This extrudable mixture may be in the form of a paste. The alumina which is used to form this extrudable mixture may be in the form of a hydrated alumina, such as pseudoboehmite.

The zeolite, which is used to form the extrudable mass with alumina and water, has a low silanol content. This silanol content may be less than 10%, e g , less than 5% expressed in terms of silicons containing silanols vs. total silicons. These percentages of silanol content may be determined by $^{29}$Si MAS NMR. Silicon-29 NMR is an effective tool to determine the silanol content. A $^{29}$Si NMR spectrum of a high-silica zeolite typically exhibits three Si species corresponding to framework Si, silanol (SiOH), and diol (Si(OH)$_2$). By integrating the areas of these peaks, the silanol content can be determined. The method is described by E. Lippmaa, M. Maegi, A. Samoson, M. Tarmamak, and G. Engelhardt in the *Am. Chem. Soc.* 103, 4992, (1981). Other techniques that can measure silanol content semi-quantitatively, including FT-IR and proton NMR, can also be used.

It will be understood that, whenever the silanol content of a zeolite is referred to herein, this silanol content is attributed exclusively to silanols which are part of the zeolite framework and excludes non-framework silanols, such as those which may be present from amorphous silica impurities and/or occlusions, e.g., carried over from the reaction mixture used to prepare the zeolite.

Zeolites which may be used to form catalysts by methods disclosed herein include medium-pore size and large-pore size zeolites.

A convenient measure of the extent to which a zeolite provides control of access to molecules of varying sizes to its internal structure is the Constraint Index of the zeolite. Zeolites which provide a highly restricted access to an egress from its internal structure have a high value for the Constraint Index, and zeolites of this kind usually have pores of small size, e.g., less than 5 Angstroms. On the other hand, zeolites which provide relatively free access to the internal zeolite structure have a low value for the Constraint Index, and usually pores of large size, e.g., greater than 8 Angstroms. The method by which Constraint Index is determined is described fully in U.S. Pat. No. 4,016,218, incorporated herein by reference for details of the method.

A zeolite which may be used in catalyst preparation described herein may be a medium- or large-pore size zeolite. This zeolite may have a Constraint Index of 12 or less. Zeolites having a Constraint Index of 2–12 are generally regarded to be medium-pore size zeolites. Zeolites having a Constraint Index of less than 1 are generally regarded to be large-pore size zeolites. Zeolites having a Constraint Index of 1–2 may be regarded as either medium- or large-pore size zeolites.

The members of the class of medium-pore size zeolites may have an effective pore size of generally from about 5 to about 8 Angstroms, such as to freely sorb normal hexane. In addition, the structures provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the medium-pore size type. Windows of 10-membered rings are preferred, although, in some instances, excessive puckering of the rings or pore blockage may render these zeolites ineffective.

Although 12-membered rings in theory would not offer sufficient constraint to constitute a medium-size pore, it is noted that the puckered 12-ring structure of TMA offretite does show some constrained access. Other 12-ring structures may exist which may be regarded to be medium-pore sized, and therefore, it is not the present intention to classify a particular zeolite solely from theoretical structural considerations.

Constraint Index (CI) values for some typical materials are:

| | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |

-continued

| CI (at test temperature) | |
|---|---|
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Mordenite | 0.5 (316° C.) |
| Clinoptilolite | 3.4 (510° C.) |
| Mordenite | 0.5 (316° C.) |
| REY | 0.4 (316° C.) |
| Amorphous Silica—alumina | 0.6 (538° C.) |
| Dealuminized Y (Deal Y) | 0.5 (510° C.) |
| Erionite | 38 (316° C.) |
| Zeolite Beta | 0.6–2.0 (316° C.–399° C.) |

The above-described Constraint Index provides a definition of those zeolites which are particularly useful in the present catalysts. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given medium- or large-pore size zeolite of 12 or less.

Examples of zeolites having a Constraint Index of from 1 to 12 include ZSM-5, ZSM-11, ZSM-12, ZSM-22, ZSM-23, ZSM-35, ZSM-38, and ZSM-48.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-22 is described in U.S. Pat. No. 4,556,477, the entire contents of which is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,406,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

The large-pore zeolites, including those zeolites having a Constraint Index less than 2, are well known to the art and have a pore size sufficiently large to admit the vast majority of components normally found in a feed chargestock. The zeolites are generally stated to have a pore size in excess of 7 Angstroms and are represented by zeolites having the structure of, e.g., Zeolite Beta, Zeolite Y, Ultrastable Y (USY), Dealuminized Y (Deal Y), Mordenite, ZSM-3, ZSM-4, ZSM-10, ZSM-18, and ZSM-20. A crystalline silicate zeolite well known in the art and useful in the present invention is faujasite. The ZSM-20 zeolite resembles faujasite in certain aspects of structure, but has a notably higher silica/alumina ratio than faujasite, as does Deal Y.

Although zeolite Beta has a Constraint Index less than 2, it is to be noted that it does not have the same structure as the other large-pore zeolites, nor does it behave exactly like a large-pore zeolite. However, zeolite Beta is a particularly preferred zeolite for use in the present reaction.

ZSM-4 is described in U.S. Pat. No. 3,923,639.

ZSM-10 is described in U.S. Pat. No. 3,692,470.

ZSM-20 is described in U.S. Pat. No. 3,972,983.

Zeolite Beta is described in U.S. Pat. No. 3,308,069 and Re. No. 28,341.

Low sodium Ultrastable Y molecular sieve (USY) is described in U.S. Pat. Nos. 3,293,192 and 3,449,070.

Dealuminized Y zeolite (Deal Y) may be prepared by the method found in U.S. Pat. No. 3,442,795.

Zeolite UHP-Y is described in U.S. Pat. No. 4,401,556.

Another zeolite which may be used in the present catalyst is MCM-22. MCM-22 is described in U.S. Pat. No. 4,954,325, as well as in U.S. Pat. No. 5,107,054, the entire disclosures of which are expressly incorporated herein by reference.

A particular zeolite for use in the present catalyst is zeolite Y.

Zeolite Y is normally synthesized in forms having silica:alumina ratios up to about 5:1. These as-synthesized forms of zeolite Y may be subjected to various treatments to remove structural aluminum therefrom. Many of these techniques rely upon the removal of aluminum from the structural framework of the zeolite by chemical agents appropriate to this end. A considerable amount of work on the preparation of aluminum deficient faujasites has been performed and is reviewed in *Advances in Chemistry Series No. 121, Molecular Sieves*, G. T. Kerr, American Chemical Society (1973). Specific methods for preparing dealuminized zeolites are described in the following, and reference is made to them for details of the method: *Catalysis by*

*Zeolites,* International Symposium on Zeolites, Lyon, Elsevier Scientific Publishing Co., (1980) (dealuminization of zeolite Y with silicon tetrachloride); U.S. Pat. No. 3,442,795 and G.B. No. 1,058,188 (hydrolysis and removal of aluminum by chelation); G.B. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halide and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); DE-OS No. 2,510,740 (treatment of zeolite with chlorine or chlorine-containing gases at high temperatures);NL No. 7,604,264 (acid extraction); JA No. 53,101,003 (treatment with EDTA or other materials to remove aluminum); and *J. Catal.* 54, 295 (1978) (hydrothermal treatment followed by acid extraction).

Highly siliceous forms of zeolite Y may be prepared by steaming or by acid extraction of structural aluminum (or both) but because zeolite Y in its normal, as-synthesized condition, is unstable to acid, it must first be converted to an acidstable form. Methods for doing this are known and one of the most common forms of acid-resistant zeolite Y is known as "Ultrastable Y" (USY); it is described in U.S. Pat. Nos. 3,293,192 and 3,402,996 and the publication, *Society of Chemical Engineering (London) Monograph Molecular Sieves,* 186 (1968) by C. V. McDaniel and P. K. Maher, and reference is made to these for details of the zeolite and its preparation. In general, "ultrastable" refers to Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size. The ultrastable zeolite is identified both by the smaller unit cell and the low alkali metal content in the crystal structure.

The ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 540° C. to 800° C. for up to several hours, cooled and successively base exchanged with an aqueous solution of an ammonium salt until the alkali metal content is reduced to less than 1 weight percent, followed by washing and calcination again at a temperature of 540° C. to 800° C. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite.

The ultrastable zeolite Y may then be extracted with acid to produce a highly siliceous form of the zeolite.

Other methods for increasing the silica:alumina ratio of zeolite Y by acid extraction are described in U.S. Pat. Nos. 4,218,307; 3,591,488 and 3,691,099 to which reference is made for details of these methods.

In addition to the above-mentioned USY form of zeolite Y, other known forms of zeolite Y, including the rare earth exchanged Y form (REY), may be used in the present catalyst.

The zeolite Y used in the present catalyst may have a unit cell size (UCS) of, for example, 24.5 Angstroms or less, e.g., 24.15–24.50 Angstroms, e.g., 24.20–24.40 Angstroms. Such zeolites having a low UCS, e.g., of 24.15–24.30 Angstroms, may be particularly advantageous.

Zeolite Y with a low silanol content may be manufactured or obtained directly from commercial vendors. The silanol content of zeolites can be adjusted by various treatments including synthesis, thermal or hydrothermal treatments as described in the previously cited literature.

The extrudable mass may be passed through an extrusion die under conditions sufficient to form cylindrical extrudates, which may, in turn, be broken into pellets.

The strength of the extrudate pellets may ultimately be increased to optimum levels by a calcination procedure. However, the uncalcined extrudate has sufficient green strength to withstand the usual handling procedures, which involve drying and possibly ion exchanging and/or impregnating with sources of hydrogenation components. Drying of the extrudate pellets may take place at temperatures of from 100° C. to 150° C. This drying procedure removes water which is physically included or associated with the extrudate. Further water, termed chemically bound water, may be removed from the extrudate upon calcination at higher temperatures.

The crush strength of the green strength extrudate material is improved by a calcination step. This calcination may take place at a sufficient temperature, e.g., greater than 400° C., for a sufficient time, e.g., at least 1 hour, in an appropriate atmosphere, e.g., nitrogen or air. This calcination may cause phase transformation of the alumina binder to occur. More particularly, the alumina binder may be transformed into the form of gamma-alumina during this calcination step.

The extrudate catalyst may be combined with a hydrogenation component or a source of a hydrogenation component either before or after the calcination step. The hydrogenation component may be a hydrogenation metal which may be a noble metal or metals, or a non-noble metal or metals. Suitable noble metals include platinum, palladium, and other members of the platinum group such as iridium and rhodium. Suitable non-noble metals include those of Groups VA, VIA and VIIIA of the Periodic Table. The Periodic Table used in this specification is the table approved by IUPAC and the U.S. National Bureau of Standards, as shown for instance in the table of the Fisher Scientific Company, Catalog No. 5-702-10. Preferred non-noble metals are molybdenum, tungsten, cobalt and nickel and combinations of these metals such as cobalt-molybdenum, nickel-molybdenum, nickel-tungsten and cobalt-nickel-tungsten. Metal components may be pre-sulfided prior to use by exposure to a sulfur-containing gas such as hydrogen sulfide at an elevated temperature to convert the oxide form to the corresponding sulfide form of the metal.

The metal may be incorporated into the catalyst by any suitable method such as impregnation or exchange onto the extrudate. The metal may be incorporated in the form of a cationic, anionic or neutral complex such as $Pt(NH_3)_4^{2+}$ and cationic complexes of this type will be found convenient for exchanging metals onto the zeolite. Anionic complexes such as the molybdate or metatungstate ions are useful for impregnating metals into the catalysts.

The amount of the hydrogenation metal is suitably from 0.01 to 30 percent by weight, normally 0.1 to 20 percent by weight based on the weight of the zeolite and matrix plus the weight of the hydrogenation metal, although this will, of course, vary with the nature of the component, less of the highly active noble metals, particularly platinum, being required than of the less active base metals.

The relative proportions of zeolite component and alumina matrix may vary widely with the zeolite content ranging from between 1 to 99, more usually 5 to 80, percent by weight of the composite.

The hydrocracking process can be carried out at temperatures ranging from about 250° C. (480° F.) to about 500° C. (930° F.), e.g., from about 300° C. (570° F.) to about 450° C. (840° F.); hydrogen pressures ranging from about 2 to 21 MPa, e.g., from about 3 to 21 MPa; liquid hourly space velocities ranging from about 0.05 to about 10, e.g., from about 0.2 to 3; $H_2$ circulations ranging from about 500 to about 10,000 scfb, e.g., from about 2000 to about 6000 scfb.

The conversion may be conducted by contacting the feedstock with a fixed stationary bed of catalyst, a fixed fluidized bed or with a transport bed. A simple configuration is a trickle-bed operation in which the feed is allowed to trickle through a stationary fixed bed. With such a configuration, it is desirable to initiate the reaction with fresh catalyst at a moderate temperature which is of course raised as the catalyst ages, in order to maintain catalytic activity.

A preliminary hydrotreating step to remove nitrogen and sulfur and to saturate aromatics to naphthenes without substantial boiling range conversion will usually improve catalyst performance and permit lower temperatures, higher space velocities, lower pressures or combinations of these conditions to be employed.

The present hydrocracking process may be used for hydrocracking a variety of feedstocks such as crude petroleum, reduced crudes, vacuum tower residua, coker gas oils, cycle oils, FCC tower bottoms, vacuum gas oils, deasphalted residua and other heavy oils. These feedstocks may optionally be subjected to a hydrotreating treatment prior to being subjected to the present hydrocracking process. The feedstock, especially in the non-hydrotreated form, will contain a substantial amount boiling above 260° C. (500° F.) and will normally have an initial boiling point of about 290° C. (about 550° F.) more usually about 340° C. (650° F.). Typical boiling ranges will be about 340° C. to 565° C. (650° F. to 1050° F.) or about 340° C. to 510° C. (650° F. to 950° F.) but oils with a narrower boiling range may, of course, also be processed, for example, those with a boiling range of about 340° C. to 455° C. (650° F. to 850° F.). Heavy gas oils are often of this kind as are cycle oils and other non-residual materials. Oils derived from coal, shale or tar sands may also be treated in this way. It is possible to co-process materials boiling below 260° C. (500° F.) but they will be substantially unconverted. Feedstocks containing lighter ends of this kind will normally have an initial boiling point above 150° C. (about 300° F.). Feedstock components boiling in the range of 290° to 340° C. (about 550° to 650° F.) can be converted to products boiling from 230° C. to 290° C. (about 450° to 550° F.) but the heavier ends of the feedstock are converted preferentially to the more volatile components and therefore the lighter ends may remain unconverted unless the process severity is increased sufficiently to convert the entire range of components. A particular hydrocarbon feedstock which may be used is an FCC recycle oil having an initial boiling point of at least about 343° C. (650° F.). Other examples of feedstocks include those with relatively large contents of non-aromatic hydrocarbons, such as paraffinic feedstocks, e.g., feedstocks having at least 20 percent by weight, e.g., at least 50 percent by weight, e.g., at least 60 percent by weight, of paraffins. Feedstocks, including those which have been hydrotreated, which may be used in the present process, include those having at least 70 wt. % of hydrocarbons having a boiling point of at least 204° C. (400° F.).

The hydrocarbon feedstock for the hydrocracking process may be a gas oil. This gas oil may have an initial boiling point of at least 500° F., and at least 90 wt. % of the hydrocarbons therein may have a boiling point greater than 650° F. This hydrocracking process involving a gas oil feed may involve a net production of a distillate fraction. For example, the product of the hydrocracking reaction may have at least 25 wt. % of hydrocarbons having a distillate boiling range of from 330° F. to 650° F. The distillate fraction may be recovered, preferably by a fractional distillation process.

EXAMPLE 1

Preparation of High Silica, Low Silanol USY Catalyst

Catalyst A

A commercial high silica USY zeolite containing essentially no silanol groups as determined by Si-NMR was mulled in a 50/50 wt/wt. mixture with alumina and extruded to prepare a formed mass. The extruded mass was dried at 250° F. and calcined for 3 hours in 5 v/v/min. flowing air at 1000° F. The calcined product was then steamed at 1025° F. for 24 hours in 1 atm steam. The steamed extrudates were impregnated to incipient wetness with a solution of ammonium metatungstate then treated in the following stepwise manner: 1) dried at 250° F. overnight and 2) calcined for 2 hours at 1000° F. in flowing air. This calcined product was then impregnated to incipient wetness with a nickel nitrate solution and steps 1–2 were repeated. The properties of the final catalyst, labeled Catalyst A, are listed in Table 1.

EXAMPLE 2

Preparation of High Silica, High Silanol USY Catalyst

Catalyst B

A commercial high silica USY zeolite containing a high level of silanol groups as determined by Si-MNR was combined in a 40/60 wt/wt. mixture with alumina and extruded to prepare a formed mass. The extruded mass was dried at 250° F. and calcined for 3 hours in 5 v/v/min. flowing air at 1000° F. The calcined extrudates were impregnated to incipient wetness with a solution of ammonium metatungstate then treated in the following stepwise manner: 1) dried at 250° F. overnight and 2) calcined for 3 hours at 1000° F. in flowing air. This calcined product was then impregnated to incipient wetness with a nickel nitrate solution and steps 1–2 were repeated. The properties of the final catalyst, labeled Catalyst B, are listed in Table 1.

The properties of a hydrotreating catalyst, referred to in Example 3, are also listed in Table 1.

TABLE 1

Catalyst Properties

| | Hydrotreating | Catalyst A | Catalyst B |
|---|---|---|---|
| Zeolite Properties | | | |
| $SiO_2/Al_2O_3$ by NMR | — | 220 | 200 |
| Si as Silanols, % (by Si-NMR) | — | ~0 | 31 |
| Unit Cell Size, Angstroms | — | 24.25 | 24.28 |
| Catalyst Properties | | | |
| Zeolite, wt. % | — | 50[1] | 40[1] |
| Zeolite Alpha in $Al_2O_3$ binder | — | 10 | 45 |
| Surface Area, $m^2/g$ | 138 | 335 | 252 |
| Pore Volume, cc/g | 0.39 | 0.56 | 0.48 |
| Nickel, wt. % | 3.9 | 3.9 | 3.7 |
| Molybdenum, wt. % | 13.7 | — | — |
| Tungsten, wt. % | — | 12.6 | 16.6 |

[1] Zeolite content in alumina mixture prior to metals addition

EXAMPLE 3

This Example illustrates the yield advantage when hydrocracking a Persian Gulf VGO with a hydrocracking catalyst prepared from USY with low silanol content prepared in Example compared to that with a similar catalyst prepared from USY with high silanol content described in Example 2.

The experiments were carried out in a fixed-bed pilot unit employing a commercial $NiMo/Al_2O_3$ hydrotreating (HDT) catalyst and the USY hydrocracking (HDC) catalyst. The pilot unit was operated by cascading effluent from the HDT stage to the HDC stage directly without removal of ammonia, hydrogen sulfide, and light hydrocarbon gases at the interstage. The conditions employed for the experiments included temperatures from 715°–765° F. (about 380°–410° C.), 0.5 LHSV (based on fresh feed relative to total HDT and HDC catalyst), 4000 scf/bbl (712 n.l. $1^{-1}$) of once-through hydrogen circulation, and hydrogen inlet pressure of 815 psia (5.61 MPa). The ratio of HDT to HDC catalyst was typically 1/2, vol/vol.

The feedstock for this Example was a nominal 650°–1050° F. (about 345°–565° C.) Persian Gulf VGO (vacuum gas oil) having the properties shown in Table 2 below.

TABLE 2

Persian Gulf VGO Feedstock Properties

| General Properties | |
|---|---|
| API Gravity | 22.0 |
| Hydrogen, wt. % | 12.53 |
| Sulfur, wt. % | 2.53 |
| Nitrogen, ppm | 780 |
| Pour point, °F. | 100 |
| KV @ 40° C., cSt. | 74.34 |
| KV @ 100° C., cSt. | 7.122 |
| Composition, wt. % | |
| Paraffins | 24.1 |
| Naphthenes | 22.1 |
| Aromatics | 53.8 |
| Distillation, °F. | (D2887) |

TABLE 2-continued

Persian Gulf VGO Feedstock Properties

| IBP | 546 |
|---|---|
| 5% | 627 |
| 10% | 664 |
| 30% | 760 |
| 50% | 831 |
| 70% | 906 |
| 90% | 1003 |
| 95% | 1041 |
| EP | 1158 |

Table 3 shows the improved performance of Catalyst A prepared from low silanol USY compared to Catalyst B. At equivalent 650° F boiling range conversion, Catalyst A provides higher yield of valuable distillate product (330°–650° F.) with lower yield of light gas ($C_1$–$C_4$) and naphtha ($C_5$–330° F.). Hydrogen consumption is lower due to reduced light gas product. Distillate selectivity, defined as distillate yield/650° F.+conversion, is 4% higher for Catalyst A.

TABLE 3

Hydrocracking Performance with Persian Gulf VGO

| | Catalyst A | Catalyst B |
|---|---|---|
| Temperature, °F. | 755 | 765 |
| 650° F.+ Conversion, wt. % | 40.9 | 40.7 |
| Yields, wt. % | | |
| $H_2S$ | 2.5 | 2.7 |
| $NH_3$ | 0.1 | 0.1 |
| $C_1$–$C_4$ | 2.0 | 2.5 |
| $C_5$–330° F. | 8.7 | 9.9 |
| 330–650° F. | 32.7 | 31.0 |
| 650° F.+ | 54.7 | 54.9 |
| $H_2$ Consumption, scf/bbl | 430 | 570 |
| Distillate Selectivity | 80% | 76% |

(Distillate yield/650° F.+ conversion)

What is claimed is:

1. A process for hydrocracking a hydrocarbon feedstock, said process comprising contacting said feedstock and hydrogen with a hydrocracking catalyst under sufficient hydrocracking conditions, said hydrocracking catalyst comprising a hydrogenation component and an extrudate prepared according to a method for preparing an alumina bound zeolite catalyst, said method comprising the steps of:

(a) determining the silanol content of a zeolite;

(b) mulling together alumina, said zeolite of step (a), and water under conditions sufficient to form an extrudable mass comprising an intimate mixture of alumina and said zeolite;

(c) extruding the extrudable mass of step (b) under conditions sufficient to form a green strength extrudate; and (d) calcining the green strength extrudate of step (c) under conditions sufficient to increase the crush strength of the extrudate, wherein said zeolite, which is introduced into mulling step (b), has a silanol content of less than 10%, expressed in terms of silicons included in silanols vs. total silicons.

2. A process according to claim 1, wherein said green strength extrudate is calcined at a temperature of at least 400° C. in calcination step (d).

3. A process according to claim 1, wherein said alumina, which is introduced into mulling step (b), is in the form of pseudoboehmite.

4. A process according to claim 3, wherein alumina undergoes phase transformation to gamma-alumina during calcination step (d).

5. A process according to claim 1, wherein said green strength extrudate of step (c) is dried under conditions sufficient to remove physically included water therefrom prior to calcination step (d).

6. A process according to claim 5, wherein the drying of the extrudate prior to step (d) takes place at a temperature of from about 100° C. to about 150° C.

7. A process according to claim 1, wherein said zeolite is selected from the group consisting of zeolite X, zeolite Y, zeolite beta, mordenite, ZSM-20, and ZSM-10.

8. A process according to claim 1, wherein said zeolite is steamed under conditions sufficient to reduce the silanol content thereof prior to mulling step (b).

9. A process according to claim 1, wherein the silanol content of the zeolite is measured by $^{29}$Si MAS NMR.

10. A process according to claim 1, wherein said hydrogenation component is impregnated onto said extrudate either before or after the calcination step (d).

11. A process according to claim 10, wherein said hydrocarbon feedstock is a gas oil.

12. A process according to claim 11, wherein said gas oil has an initial boiling point of at least 500° F. and at least 90 wt. % of the hydrocarbons in said gas oil have a boiling point greater than 650° F.

13. A process according to claim 12, wherein the product of the hydrocracking comprises at least 25 weight percent of a distillate fraction having a boiling range of from 330° F. to 650° F. and wherein said distillate fraction is recovered.

14. A process according to claim 13, wherein the zeolite is a USY.

15. A process according to claim 14, wherein said hydrogenation component comprises nickel and tungsten.

16. A process for hydrocracking a hydrocarbon feedstock, said process comprising contacting said feedstock and hydrogen with a hydrocracking catalyst under sufficient hydrocracking conditions, said hydrocracking catalyst comprising a hydrogenation component and an extrudate prepared according to a method for preparing an alumina bound zeolite Y catalyst, said method comprising the steps of:

(a) mulling together alumina, zeolite Y, and water under conditions sufficient to form an extrudable mass comprising an intimate mixture of alumina and zeolite Y;

(b) extruding the extrudable mass of step (a) under conditions sufficient to form a green strength extrudate; and (c) calcining the green strength extrudate of step (b) under conditions sufficient to increase the crush strength of the extrudate, wherein said zeolite Y, which is introduced into mulling step (a), has a silanol content of less than 10%, expressed in terms of silicons included in silanols vs. total silicons.

17. A process according to claim 16, wherein said hydrocarbon feedstock is a gas oil, and wherein said gas oil has an initial boiling point of at least 500° F. and at least 90 wt. % of the hydrocarbons in said gas oil have a boiling point greater than 650° F.

18. A process according to claim 17, wherein the product of the hydrocracking comprises at least 25 weight percent of a distillate fraction having a boiling range of from 330° F. to 650° F. and wherein said distillate fraction is recovered.

19. A process according to claim 18, wherein the zeolite Y is a USY, and wherein said hydrogenation component comprises nickel and tungsten.

20. A process according to claim 16, wherein said hydrogenation component comprises nickel and molybdenum.

21. A process according to claim 16, wherein said hydrogenation component comprises palladium.

\* \* \* \* \*